(12) United States Patent
Shimomura et al.

(10) Patent No.: US 12,488,699 B2
(45) Date of Patent: Dec. 2, 2025

(54) CLASS SYSTEM, VIEWING TERMINAL, INFORMATION PROCESSING METHOD, AND PROGRAM

(71) Applicant: DWANGO Co., Ltd., Tokyo (JP)

(72) Inventors: Hiroki Shimomura, Tokyo (JP); Emiko Yoshihara, Tokyo (JP); Satoshi Iguchi, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 0 days.

(21) Appl. No.: 17/762,193

(22) PCT Filed: Nov. 20, 2020

(86) PCT No.: PCT/JP2020/043485
§ 371 (c)(1),
(2) Date: Mar. 21, 2022

(87) PCT Pub. No.: WO2021/106803
PCT Pub. Date: Jun. 3, 2021

(65) Prior Publication Data
US 2022/0375358 A1 Nov. 24, 2022

(30) Foreign Application Priority Data
Nov. 28, 2019 (JP) .................................. 2019-215541

(51) Int. Cl.
*G09B 5/02* (2006.01)
*G06T 13/40* (2011.01)
(Continued)

(52) U.S. Cl.
CPC ................ *G09B 5/02* (2013.01); *G06T 13/40* (2013.01); *G06T 19/006* (2013.01);
(Continued)

(58) Field of Classification Search
CPC . G09B 5/06; G09B 5/065; G09B 5/02; H04N 23/69; H04N 23/698; H04N 13/33;
(Continued)

(56) References Cited

U.S. PATENT DOCUMENTS 10,732,721 B1 * 8/2020 Clements ................ B66B 1/468
2003/0030636 A1 * 2/2003 Yamaoka ............. H04N 5/2627
348/E5.042

(Continued)

FOREIGN PATENT DOCUMENTS

CN 102646344 A 8/2012
CN 105989753 A 10/2016
(Continued)

OTHER PUBLICATIONS

International Search Report dated Feb. 9, 2021 in corresponding application No. PCT/JP2020/043485; 6 pgs.
(Continued)

*Primary Examiner* — Timothy A Musselman
(74) *Attorney, Agent, or Firm* — Maier & Maier, PLLC

(57) ABSTRACT

A class system for taking a class conducted in an immersive virtual space by connecting a communication class server and a student terminal. The communication class server includes a delivery unit that delivers, to the student terminal, a class content for viewing a class being conducted in the virtual space, and a transmission unit that transmits, to the student terminal, a display signal, a non-display signal, an operation permission signal, and an operation prohibition signal respectively set according to the progress of the class. The student terminal includes a VR function unit that disposes, in the virtual space, an avatar of a student that uses the student terminal and controls the avatar, receives the class content, and displays the class content from the avatar's point of view.

10 Claims, 9 Drawing Sheets

(51) Int. Cl.
    *G06T 19/00* (2011.01)
    *H04N 23/698* (2023.01)
    *G06F 3/01* (2006.01)
    *G09B 5/06* (2006.01)
    *H04N 13/332* (2018.01)

(52) U.S. Cl.
    CPC ........... *H04N 23/698* (2023.01); *G06F 3/012* (2013.01); *G06T 2219/024* (2013.01); *G09B 5/065* (2013.01); *H04N 13/332* (2018.05)

(58) Field of Classification Search
    CPC ....... H04N 13/332; G06T 13/40; G06T 19/00; G06T 19/006; G06T 2219/024; G06F 3/012
    See application file for complete search history.

(56) References Cited

U.S. PATENT DOCUMENTS

| | | | | |
|---|---|---|---|---|
| 2005/0278691 | A1* | 12/2005 | MacPhee | G06F 9/451 717/104 |
| 2012/0327175 | A1* | 12/2012 | Couse | H04L 12/1818 348/E7.083 |
| 2016/0143602 | A1* | 5/2016 | Hiroike | A61B 6/5258 378/91 |
| 2017/0256174 | A1* | 9/2017 | Goodfriend | H04W 12/12 |

FOREIGN PATENT DOCUMENTS

| | | |
|---|---|---|
| CN | 106781755 A | 5/2017 |
| CN | 106981225 A | 7/2017 |
| CN | 107103801 A | 8/2017 |
| CN | 108010394 A | 5/2018 |
| CN | 108538112 A | 9/2018 |
| CN | 109817041 A | 5/2019 |
| CN | 110290211 A | 9/2019 |
| JP | 2001-92341 A | 4/2001 |
| JP | 2003-233296 A | 8/2003 |
| JP | 2018-206331 A | 12/2018 |
| WO | WO 2018/104921 * | 6/2018 ............. A63F 13/00 |
| WO | 2019/151323 A1 | 8/2019 |

OTHER PUBLICATIONS

Mar. 31, 2002, pp. 79-86, Kawai, Takashi, "Evaluation of virtual classroom on cyberspace for hospitalized children", Transactions of the Virtual Reality Society of Japan vol. 7, No. 1, 8 pgs.
Japanese Office Action issued on Mar. 17, 2020 in corresponding application No. 2019-215541; 8 pgs.
"AR/VR Learning Experiences | zSpace", zSpace, Inc., Internet <URL:https://zspace.com/>, Searched: Mar. 17, 2022.
Office Action issued on Aug. 21, 2023 in corresponding Chinese Application No. 202080064978.8, 23 pages.
Office Action issued on Mar. 1, 2024, in corresponding Chinese Application No. 202080064978.8, 26 pages.
Office Action issued on Dec. 19, 2024, in corresponding Chinese Application No. 202080064978.8, 47 pages.
Office Action issued on Jun. 29, 2024, in corresponding Chinese Application No. 202080064978.8, 22 pages.
Office Action issued on Apr. 9, 2025, in corresponding Chinese Application No. 202080064978.8; 51 pgs.
Office Action issued on Sep. 17, 2025, in corresponding Chinese Application No. 202080064978.8, 54 pages.

* cited by examiner

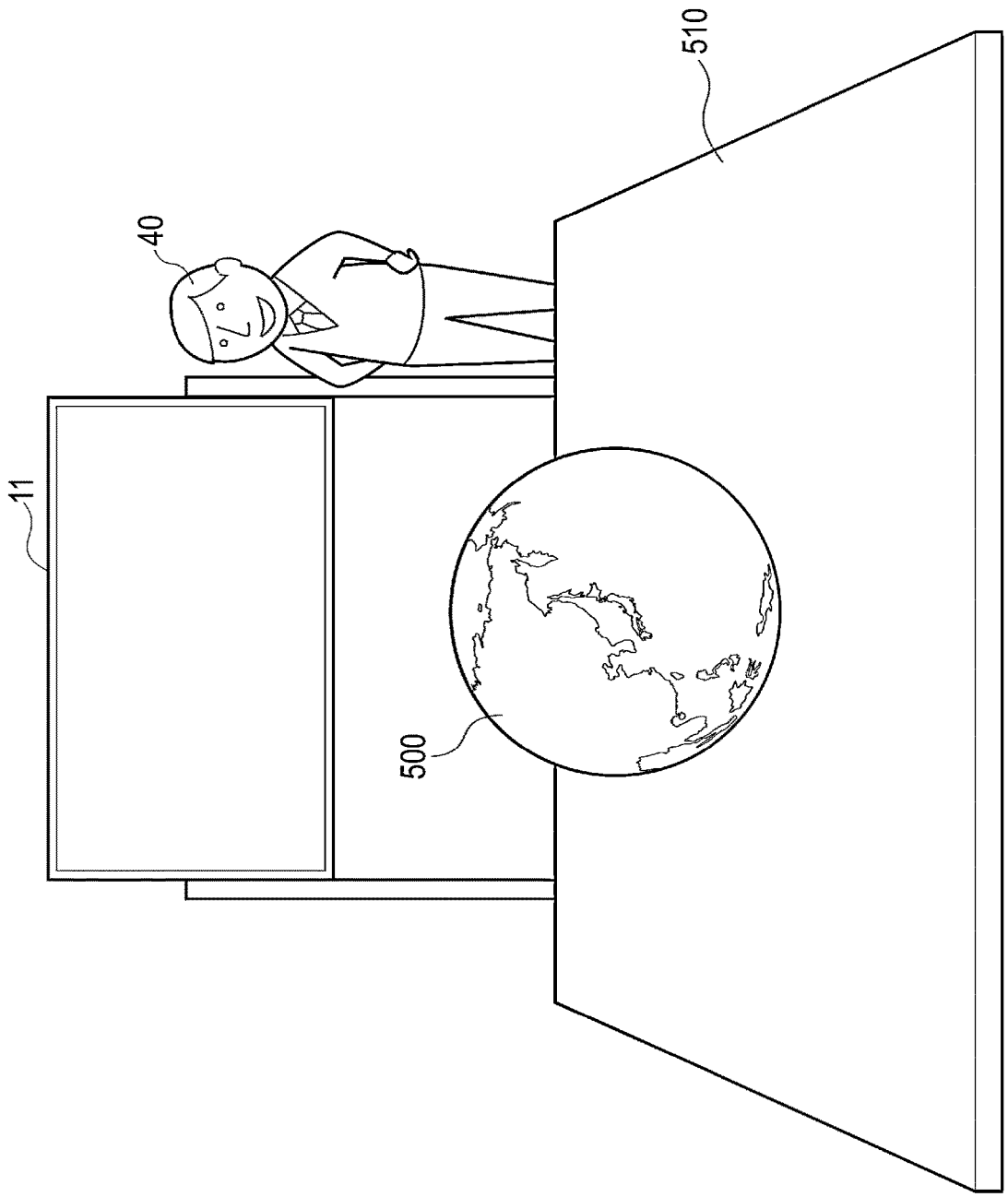

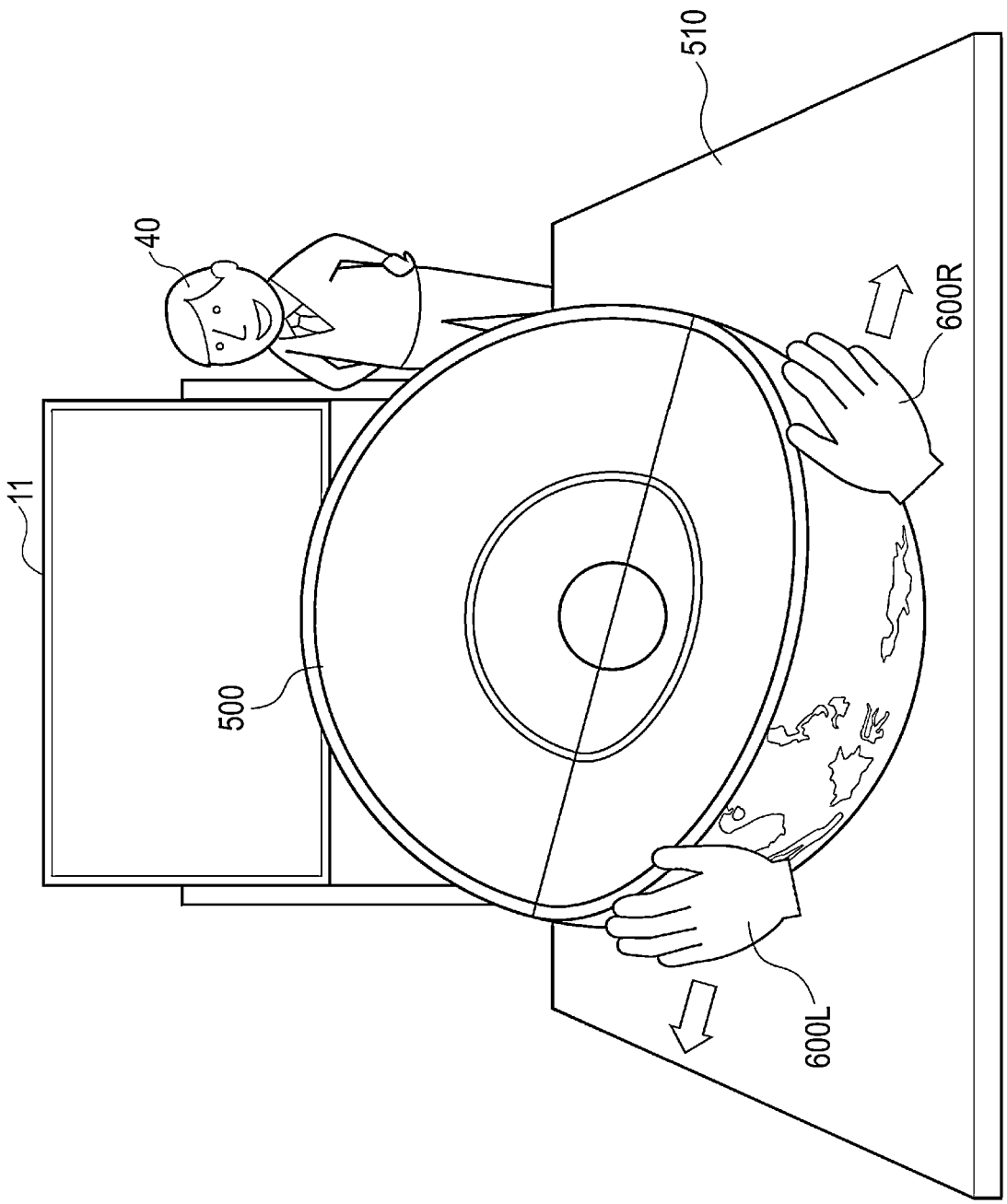

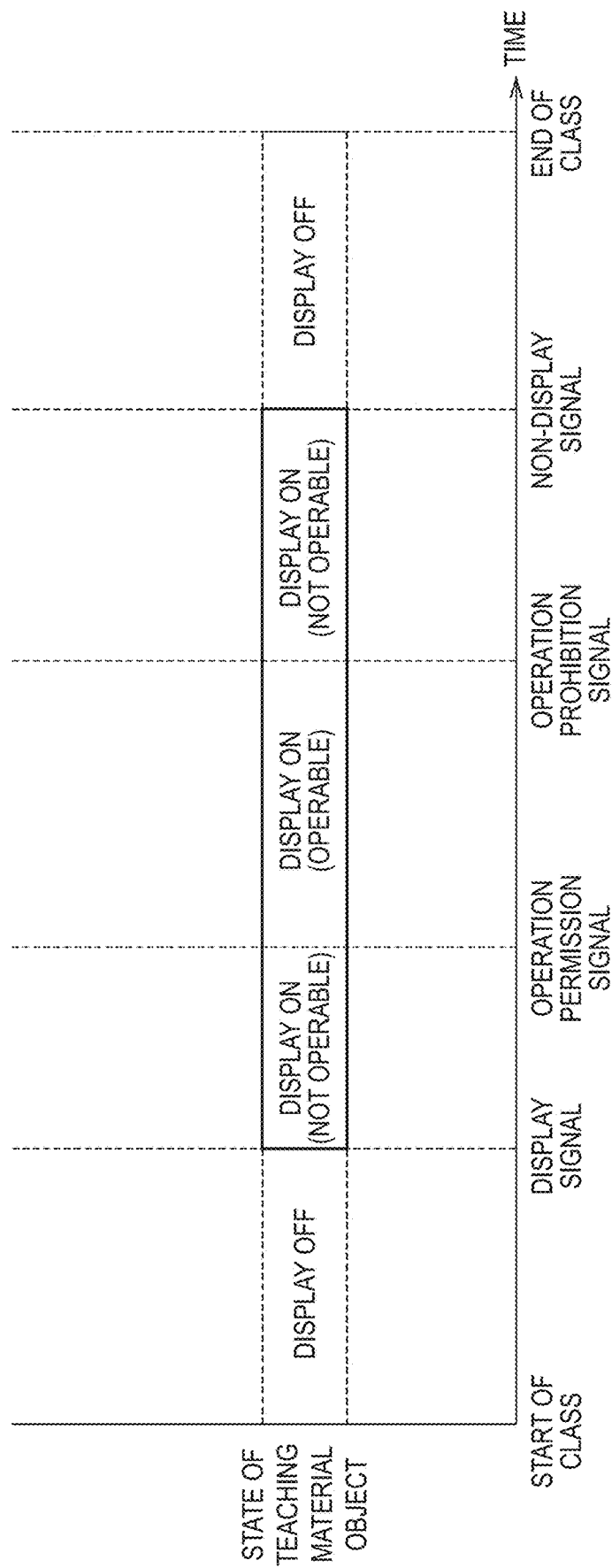

CLASS SYSTEM, VIEWING TERMINAL, INFORMATION PROCESSING METHOD, AND PROGRAM

TECHNICAL FIELD

The present invention relates to a class system, a viewing terminal, an information processing method, and a program.

BACKGROUND

In recent years, educational systems using information and communication technology (ICT) have come into widespread use.

For example, zSpace disclosed in Non-Patent Document 1 is a laptop-type learning environment including a three-dimensional stereoscopic display. Students can wear 3D deflection glasses to see a three-dimensional video or model displayed on the display. The students can also intuitively operate the displayed model with a stylus pen.

Further, Google Expeditions disclosed in Non-Patent Document 2 is a teaching material that enables a user to virtually explore the world using a VR kit. Students can view a 360-degree panoramic video. A teacher acts as a guide and explains the video to the students.

CITATION LIST

Non-Patent Document 1: "AR/VR Learning Experiences|zSpace", zSpace, Inc., Internet <URL:https://zspace.com/>

Non-Patent Document 2: "Realistic Experience in Class by Expeditions|Google for Education", Google LLC, Internet <URL: https://edu.google.com/products/vr-ar/expeditions/>

SUMMARY

Non-Patent Document 1 can promote the understanding of the students since the students can observe the object three-dimensionally and operate the displayed model. However, Non-Patent Document 1 is a laptop-type system and assumes that the teacher gives a class to the students in the same classroom. Therefore, it is difficult to use Non-Patent Document 1 in correspondence education conducted in an immersive virtual reality (VR) space.

In Non-Patent Document 2, the student only views an immersive 360-degree panoramic video, and a class is not conducted in the virtual space. In addition, it is difficult to freely operate the displayed object.

The invention has been made in view of the above-mentioned problems, and an object of the invention is to promote the understanding of students in a class conducted in an immersive virtual space.

According to an aspect of the invention, there is provided a class system that connects a communication class server and a viewing terminal to take a class conducted in an immersive virtual space. The communication class server includes: a distribution unit that distributes a panoramic video obtained by imaging a class conducted in a real space to the viewing terminal; and a transmission unit that transmits a display signal, a non-display signal, an operation permission signal, and an operation prohibition signal set according to a progress of the class to the viewing terminal. The viewing terminal includes: an avatar control unit that disposes an avatar of a student who uses the viewing terminal in the virtual space and controls the avatar; a receiving unit that receives the panoramic video; a display unit that generates the virtual space on the basis of the panoramic video and displays the panoramic video from a point of view of the avatar in the virtual space; and an object control unit that makes a three-dimensional teaching material object appear in the virtual space at a time when the display signal is received, makes the teaching material object disappear at a time when the non-display signal is received, enables the student to operate the teaching material object at a time when the operation permission signal is received, and prohibits the student from operating the teaching material object at a time when the operation prohibition signal is received.

According to the invention, it is possible to promote the understanding of students in a class conducted in an immersive virtual space.

BRIEF DESCRIPTION OF THE DRAWINGS

FIG. 7 is a diagram illustrating an aspect in which the teaching material objects are displayed in the class conducted in the virtual space.

FIG. 8 is a diagram illustrating an aspect in which the teaching material object is operated.

FIG. 9 is a diagram illustrating a change in the state of the teaching material object.

DETAILED DESCRIPTION

[Configuration of System]

Hereinafter, a class system according to an embodiment of the invention will be described with reference to the drawings.

Figure 1:
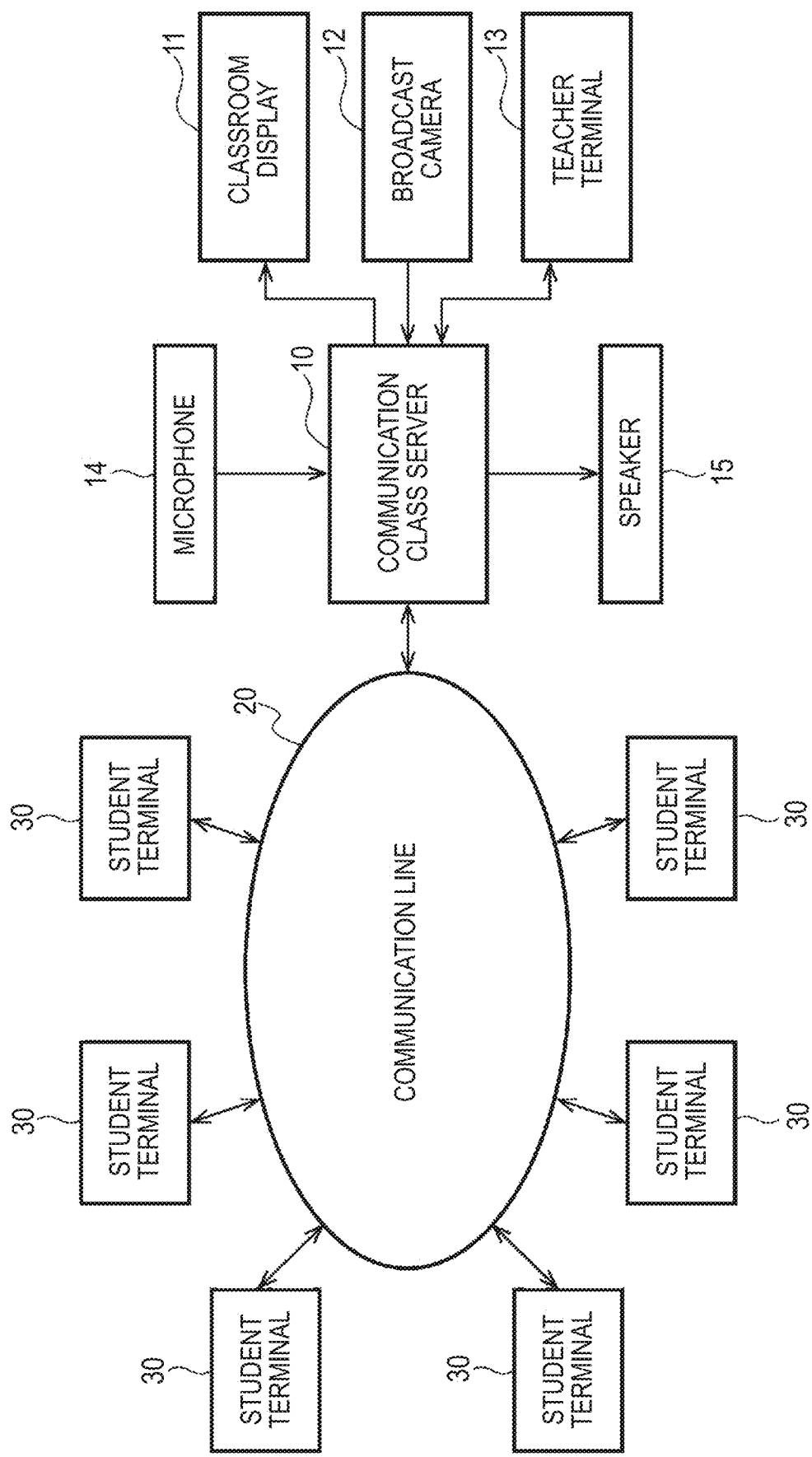
FIG. 1 is a block diagram illustrating an example of an overall configuration of a class content distribution system according to an embodiment.

The class system according to this embodiment is a class system that takes a class conducted in an immersive virtual space. The class system illustrated in FIG. 1 includes a communication class server 10 and a plurality of student terminals 30. The communication class server 10 and the plurality of student terminals 30 are connected to a communication line 20. The communication class server 10 and the plurality of student terminals 30 are disposed at separate positions. The plurality of student terminals 30 may also be disposed at separate positions. The communication line 20 is any communication line such as the Internet. In addition, six student terminals 30 are illustrated in FIG. 1. However, any number of student terminals 30 may be provided.

Any computer device having a VR function can be used as the student terminal 30. The student terminal 30 is connected to a head-mounted display (HMD) that is worn by the student to view the inside of the virtual space and a controller that receives an input from the student and operates a student avatar disposed in the virtual space.

The student terminal 30 receives information for viewing the class in the virtual space from the communication class server 10 and displays the information on the HMD. The HMD detects the movement of the head of the student and changes an imaging direction of a virtual camera that images the virtual space according to the movement of the head. In other words, the student can move the head to see in any direction in the virtual space. When the student operates the controller, the student avatar in the virtual space is moved according to the input operation. For example, when the student raises the hand holding the controller, the student avatar also raises the hand.

The student can operate the student avatar and also operate a three-dimensional object (hereinafter, referred to as a teaching material object) that is displayed in front of the student avatar as the class progresses. For example, the student can change the size of the teaching material object, change a viewing direction, or shift the point of view into the teaching material object to examine the internal structure of the teaching material object.

A classroom display 11, a broadcast camera 12, a teacher terminal 13, a microphone 14, and a speaker 15 are connected to the communication class server 10. The speaker 15 includes headphones (earphones). The communication class server 10 creates class content of the class conducted in the virtual space on the basis of the information received from the connected device and distributes the class content to the student terminal 30.

Figure 2:
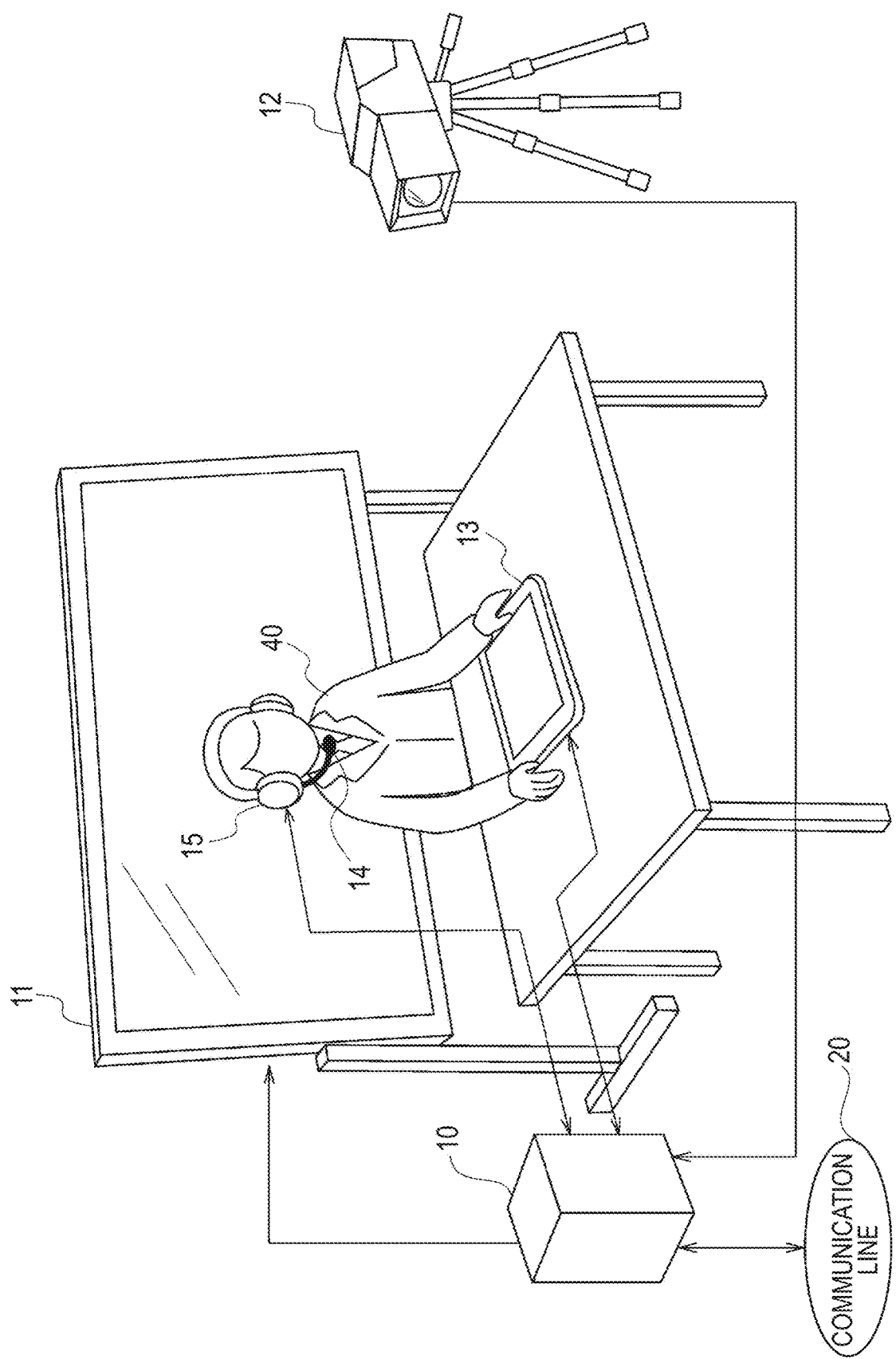
FIG. 2 is a conceptual diagram illustrating a classroom which is a distribution source of class content.

As illustrated in FIG. 2, a teacher 40 stands in front of the classroom display 11 and gives a class using the classroom display 11 and the teacher terminal 13. The classroom display 11 is a large screen display that is called an electronic blackboard. The teacher 40 performs an operation of displaying the class data stored in the communication class server 10 on the classroom display 11 and gives a class. The class data is transferred and displayed according to the utterance of the teacher 40, and the class progresses. In addition, a blackboard or a whiteboard may be used instead of the classroom display 11.

The teacher 40 uses the broadcast camera 12 to image the class. For example, a 360-degree camera (also referred to as an omnidirectional camera) that images the inside of the classroom in all circumferential directions can be used as the broadcast camera 12. A captured panoramic video (also referred to as a 360-degree video or an omnidirectional video) of the class is transmitted to the communication class server 10 and is stored as the class content. The communication class server 10 distributes the panoramic video to the student terminal 30. The student terminal 30 projects the panoramic video into the virtual space. When the broadcast camera 12 captures a panoramic video with parallax and the video with parallax is displayed on the HMD, the student can wear the HMD, enter the virtual space, and view the stereoscopic panoramic video projected into the virtual space. This enables the student to feel as if the student takes a class in an immersive and realistic classroom.

A camera that images the front side of the classroom at any angle (for example, 180 degrees) may be used as the broadcast camera 12. A rear part of the classroom that is not imaged by the broadcast camera 12 may be constructed by computer graphics by disposing floor, wall, and ceiling objects in the virtual space. When the student moves to the rear side of the classroom in the virtual space, the student sees a CG classroom instead of an empty space, and immersiveness is not impaired.

The teacher terminal 13 is a terminal that is used by the teacher 40 to conduct a class. The teacher 40 may operate the teacher terminal 13 to select the class data to be displayed on the classroom display 11. In addition, the teacher 40 may operate the teacher terminal 13 during the class to set the time when the teaching material object appears in the virtual space or the time when the teaching material object disappears. For example, the teacher 40 explains the structure of the earth in the class and then operates the teacher terminal 13 to issue an instruction to display a teaching material object simulating the earth in front of the student avatar. The teacher terminal 13 transmits the instruction to display the teaching material object to the communication class server 10. The communication class server 10 adds timing information to the instruction to display the teaching material object and records the instruction. The timing information is a numerical value indicating the degree of progress of the class. The time elapsed since the start of the class or a time stamp of the video can be used as the timing information.

The teacher 40 may operate the teacher terminal 13 to change the orientation of the teaching material object displayed on the student terminal 30, to change the size of the teaching material object, or to deform the teaching material object. The teacher terminal 13 transmits these instructions to the communication class server 10. The communication class server 10 adds the timing information to the received instruction and records the instruction. Further, the teacher 40 may operate the teacher terminal 13 to give permission to operate the teaching material object to the student or to prohibit the operation of the teaching material object.

In addition, the teacher 40 may set the instruction to operate the teaching material object not only while conducting the class, but also while viewing the taken class video after taking the class video. Further, each of the above-mentioned operations can be performed in various aspects other than the aspect in which the teacher performs the operations with the teacher terminal 13. For example, a terminal or the like that is operated by a remote class broadcast producer or director or a program distributor may be used. This point is common to each operation using the teacher terminal 13 which will be described below.

The microphone 14 collects the voice uttered by the teacher 40. The collected voice data is transmitted to the communication class server 10. The communication class server 10 distributes the voice data to the student terminal 30 along with the video.

The speaker 15 outputs, for example, instructions related to the progress of the class from the video production staff to transmit the instructions to the teacher 40.

[Configuration of Server]

Figure 3:
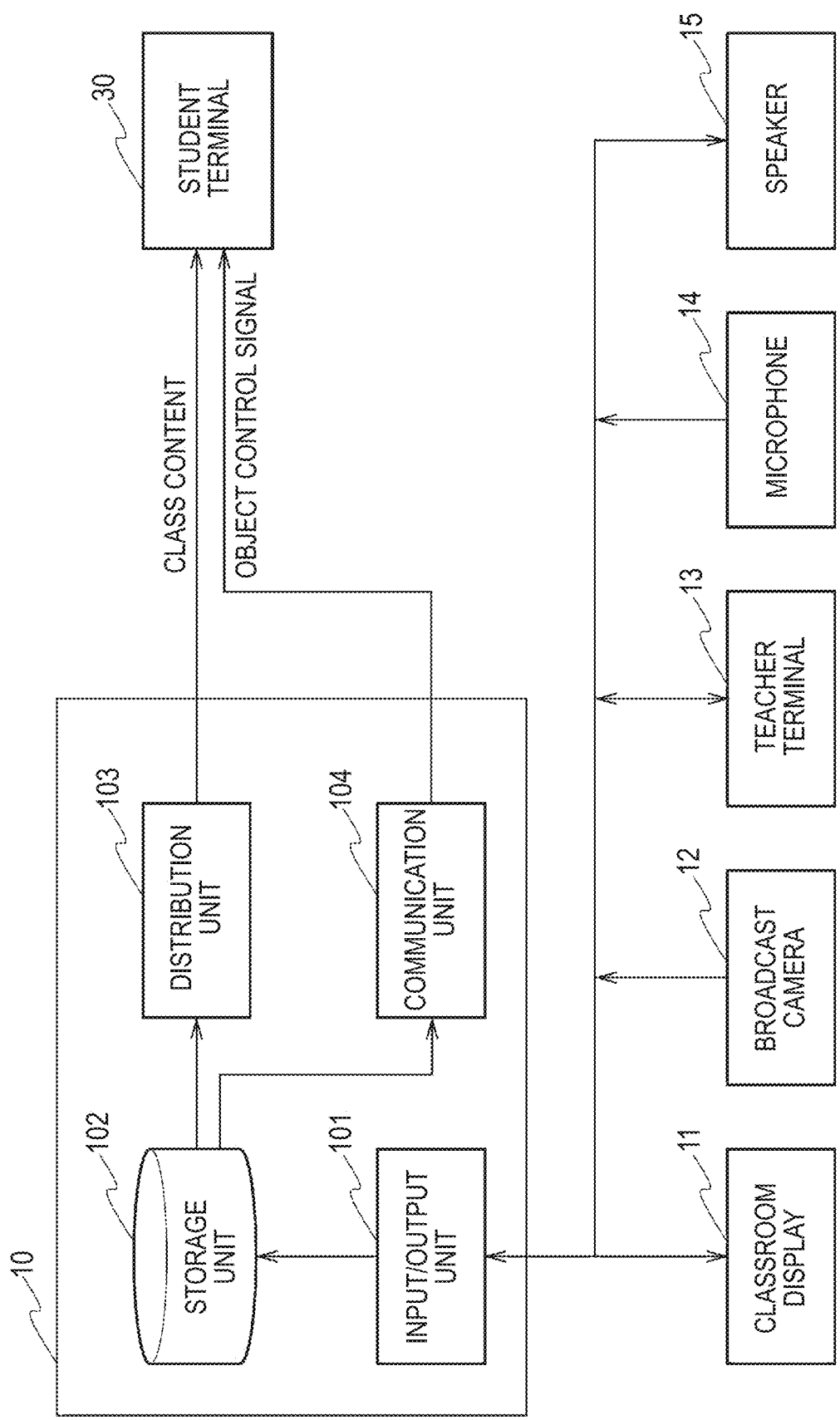
FIG. 3 is a functional block diagram illustrating an example of a configuration of a communication class server.

An example of the configuration of the communication class server 10 will be described with reference to FIG. 3. The communication class server 10 illustrated in FIG. 3 includes an input/output unit 101, a storage unit 102, a distribution unit 103, and a transmission unit 104.

The input/output unit 101 is connected to the classroom display 11, the broadcast camera 12, the teacher terminal 13, the microphone 14, and the speaker 15 and outputs the class data to the classroom display 11 or the teacher terminal 13 or inputs video data, voice data, and operations. The video data or the voice data input by the input/output unit 101 is stored as the class content in the storage unit 102.

The storage unit 102 stores data to be distributed to the student terminal 30, that is, information related to the class content and the teaching material object. The information related to the teaching material object is model data required to display the teaching material object and an instruction to the teaching material object which is set according to the progress of the class. Examples of the instruction include a display-on instruction, a display-off instruction, an operation permission instruction, and an operation prohibition instruction. The timing information is given to the instruction.

The distribution unit 103 distributes the class content in response to a request from the student terminal 30. The distribution unit 103 may stream the class content to the student terminal 30 or download the class content to the student terminal 30.

The transmission unit 104 transmits an object control signal for controlling the teaching material object to the student terminal 30 according to the progress of the class and the instruction to the teaching material object. Specifically, when the time elapsed since the start of the class or the time stamp of the video is the timing given to the instruction, the transmission unit 104 transmits the object control signal corresponding to the instruction to the student terminal 30.

[Configuration of Student Terminal]

Figure 4:
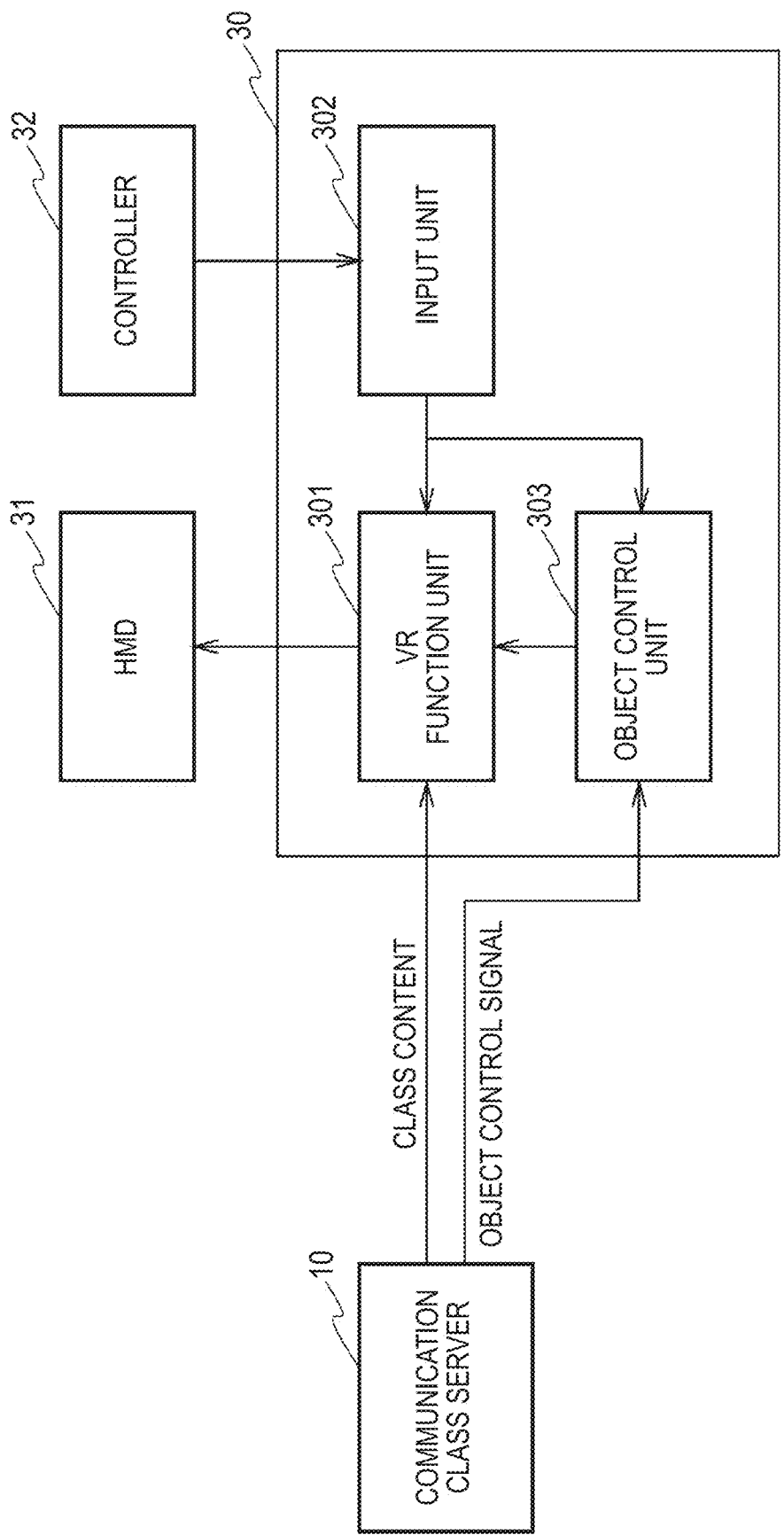
FIG. 4 is a functional block diagram illustrating an example of a configuration of a student terminal.

An example of the configuration of the student terminal 30 will be described with reference to FIG. 4. The student terminal 30 illustrated in FIG. 4 includes a VR function unit 301, an input unit 302, and an object control unit 303. The HMD 31 and the controller 32 are connected to the student terminal 30.

The VR function unit 301 receives the class content from the communication class server 10, controls the virtual camera in the virtual space on the basis of the movement of the head of the student detected by the HMD 31, and displays a video in the direction of the head of the student on the HMD 31. In addition, the VR function unit 301 controls the posture or movement of the student avatar on the basis of the information input from the HMD 31 and the controller 32, disposes the student avatar in the virtual space, and performs rendering.

When the display of the teaching material object is turned on, the VR function unit 301 disposes the teaching material object in the virtual space, combines the teaching material object with the class content, and displays the class content.

In addition, data required to render the object to be disposed in the virtual space is acquired before the class or is acquired as needed and is then stored in the VR function unit 301.

The input unit 302 inputs the movement of the head of the student detected by the HMD 31 and the operation through the controller 32. A microphone may be connected to the input unit 302 to input the voice of the student. The movement of the head of the student or the operation is transmitted to the VR function unit 301 and is used to control the student avatar. Further, the operation through the controller 32 is transmitted to the object control unit 303 and is used to operate the teaching material object.

The object control unit 303 makes the teaching material object appear or disappear in the virtual space according to the progress of the class. For example, when the object control unit 303 receives a display signal from the communication class server 10, it turns on the display of the teaching material object to make the teaching material object appear in the virtual space. When the object control unit 303 receives a non-display signal, it turns off the display of the teaching material object to make the teaching material object disappear from the virtual space. Further, when the object control unit 303 receives a signal for changing the size, a signal for changing the posture or orientation, or a signal for changing the shape, it changes the size, posture, orientation, or shape of the teaching material object in response to the received signal. When the teaching material object is animated, the teaching material object may be animated in response to, for example, animation play, pause, fast forward, and rewind signals.

In addition, the operation of making the teaching material object appear or disappear in the virtual space or the operation of changing the posture, orientation, shape, size, and the like of the teaching material object is performed by the communication class server 10 or the student terminal 30. The communication class server 10 operates the teaching material object according to a predetermined class progress scenario. The student terminal 30 operates the teaching material object according to the operation input by the student. As described above, all of the operations related to the virtual space and the objects in the virtual space in the invention can be configured to be performed by the communication class server 10, the student terminal 30, or other devices. The reason is that this configuration is based on the characteristics of VR technology and the host terminal can perform rendering on the basis of appearance data and motion data of, for example, a virtual object to generate data for displaying the virtual object, or a terminal can transmit the appearance data and motion data of the virtual object to another terminal or the like and the device or the like receiving the data can perform rendering to generate the data displaying the virtual object. The point that the subject that generates or transforms the data of the virtual object can be arbitrarily selected and the point that the subject that performs rendering for generating the data for displaying the virtual object on the basis of the generated or deformed data of the virtual object can be arbitrarily selected are common to each operation of the present disclosure and will not be further mentioned.

When the teaching material object is operable, the object control unit 303 may operate the teaching material object on the basis of the movement of the student. For example, when the student moves to open or close both arms, the object control unit 303 increases or decreases the size of the teaching material object. The position and orientation of the teaching material object may be changed such that the teaching material object can be observed from any point of view.

The student terminal 30 may transmit motion data for controlling the posture and movement of the student avatar or the voice data of the student to the communication class server 10.

For example, a general-purpose computer system including a central processing unit (CPU), a memory, a storage, a communication device, and an input/output device can be used as the communication class server 10 and the student terminal 30. In this computer system, the CPU executes a predetermined program loaded onto the memory to implement the communication class server 10 and the student terminal 30. This program may be recorded on a computer-readable recording medium, such as a magnetic disk, an optical disk, or a semiconductor memory, or may be distributed through a network.

[Process of Controlling Teaching Material Object]

A process of controlling the teaching material object will be described with reference to a sequence diagram of FIG. 5.

In Step S11, the communication class server 10 starts to distribute the class content to the student terminal 30. It is assumed that the class content is a panoramic video obtained by imaging an aspect in which the teacher 40 gives a class. The student terminal 30 projects the panoramic video into the virtual space. A video corresponding to the orientation of the head of the student is displayed on the HMD 31 worn by the student.

Figure 6:
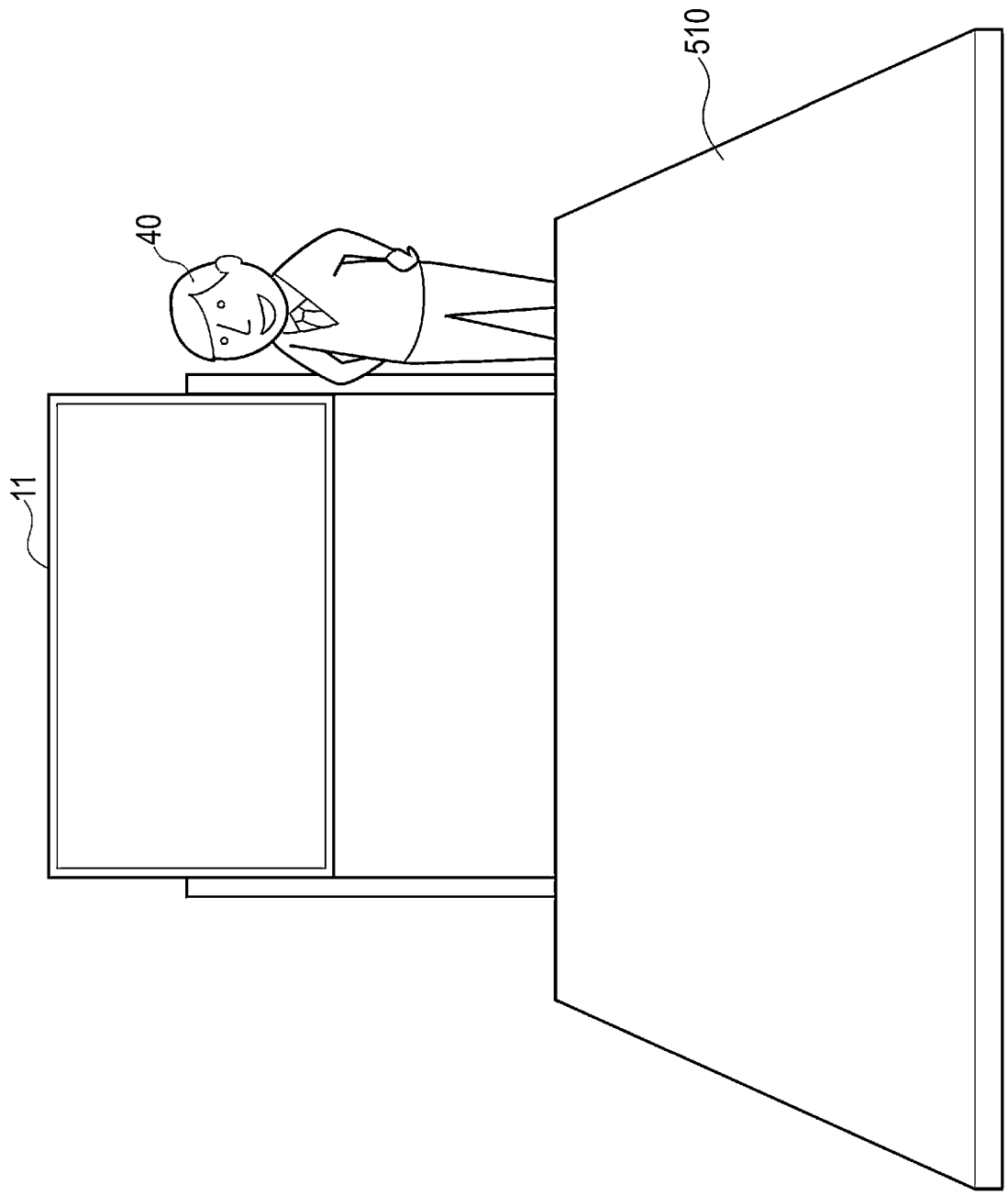
FIG. 6 is a diagram illustrating an aspect in which a student takes a class in a virtual space.

FIG. 6 is a diagram illustrating an aspect in which the student takes a class in the virtual space. A panoramic video obtained by imaging the teacher 40 and the classroom display 11 is projected into the virtual space. In FIG. 6, the wall, floor, and ceiling of the classroom are omitted in the panoramic video. A desk object 510 is a three-dimensional object that is disposed in front of the student avatar in the virtual space. Although the student avatar is omitted in FIG. 6, the student avatar is disposed at a position corresponding to the broadcast camera 12 in the virtual space. The student terminal 30 renders an image obtained by combining an object, such as the student avatar or the desk object 510, in the virtual space with the panoramic video on the basis of the position of the point of view of the student avatar and supplies the image to the HMD 31.

At the beginning of the class, the teaching material object is not displayed. Since the teaching material object is not displayed until it is needed, the student can focus on the class without being distracted by the teaching material object. Of course, the teaching material object may be displayed at the same time as the class starts.

When the class progresses and it is time for the teacher 40 to explain using the teaching material object, the communication class server 10 transmits the display signal to the student terminal 30 in Step S12. For example, the communication class server 10 associates the timing information (for example, the time elapsed since the start of the class) with the object control signal (here, the display signal). When the time elapsed since the start of the class is the time designated by the timing information, the communication class server 10 transmits the corresponding object control signal to the student terminal 30.

The student terminal 30 that has received the display signal disposes and displays the teaching material object in the virtual space in Step S13.

FIG. 7 is a diagram illustrating an aspect in which the teaching material object 500 is displayed. The HMD 31 displays an image obtained by combining the teaching material object 500 with the panoramic video. After displaying the teaching material object 500, the communication class server 10 may change the display aspect of the teaching material object 500 with the object control signal. For example, while explaining the teaching material object 500, the teacher 40 changes the size of the teaching material object 500 or changes the posture of the teaching material object 500 to reverse the teaching material object 500, using the object control signal. The control of the display aspect of the teaching material object 500 by the object control signal makes it possible for the student to accurately understand a notable part of the teaching material object 500.

When it is time to freely observe the teaching material object 500 in the class, the communication class server 10 transmits an operation permission signal to the student terminal 30 in Step S14. After receiving the operation permission signal, the student can move the teaching material object 500 and observe the teaching material object 500 from any point of view.

When a predetermined operation is input from the controller 32 operated by the student in Step S15, the student terminal 30 changes the display of the teaching material object 500 in response to the operation of the student in Step S16. For example, when the student holds the controller 32 and opens the arms, the student terminal 30 increases the size of the teaching material object 500. When the student opens the arms, a right-hand object 600R and a left-hand object 600L of the student avatar are also spread according to the movement of the student, and the size of the teaching material object 500 increases, as illustrated in FIG. 8.

The size of the teaching material object 500 may be increased until the position of the point of view, that is, the student avatar is included in the teaching material object 500. When the point of view is included in the teaching material object 500, the student terminal 30 displays the inside of the teaching material object 500. This makes it possible for the student to observe the internal structure of the object that the student is learning in class. For example, in a case in which a building is displayed as the teaching material object, when the size of the teaching material object is increased, it is possible to observe the inside of the building.

When the point of view enters the inside of the teaching material object 500, the student terminal 30 may not display an object, such as the desk object 510, other than the teaching material object 500 or may not display the panoramic video.

The student terminal 30 may be configured such that not only the size of the teaching material object 500 but also the position, orientation, posture, and the like of the teaching material object 500 can be operated in response to the operation of the student. For example, the student can turn the teaching material object 500 over to see the back of the teaching material object 500.

When the time for free observation in the class is over, the communication class server 10 transmits an operation prohibition signal to the student terminal 30 in Step S17. After receiving the operation prohibition signal, the student is prohibited from operating the teaching material object 500.

When the class progresses and the teaching material object 500 is unnecessary, the communication class server 10 transmits the non-display signal to the student terminal 30 in Step S18.

When receiving the non-display signal, the student terminal 30 makes the teaching material object disappear from the virtual space in Step S19.

Figure 5:
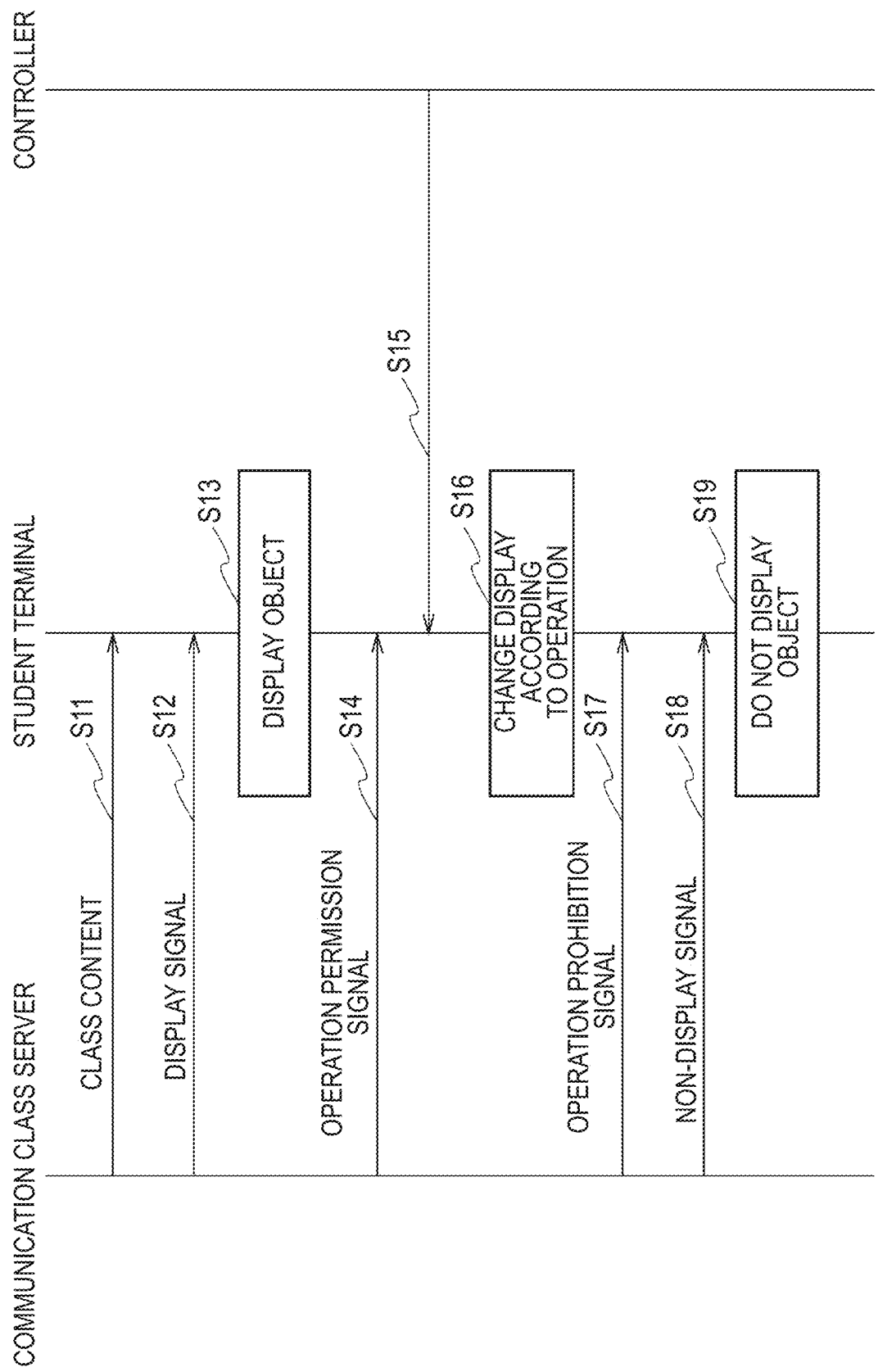
FIG. 5 is a sequence diagram illustrating the flow of a process of controlling a teaching material object.

In addition, in FIG. 5, the communication class server 10 transmits a signal to change the state of the teaching material object 500. However, the communication class server 10 may transmit instructions to the teaching material object 500 and timing information to the student terminal 30 in advance, and the student terminal 30 may be used to see the elapsed time of the class or the time stamp of the video and make the teaching material object 500 appear or disappear on the basis of the timing information.

A change in the state of the teaching material object 500 in the example illustrated FIG. 5 will be described with reference to FIG. 9. FIG. 9 illustrates the state of the teaching material object 500 according to the progress of the class.

At the beginning of the class, the display of the teaching material object 500 is in an off state.

When the student terminal 30 receives the display signal, the display of the teaching material object 500 is turned on. In this case, the teaching material object 500 is not operable, and the student is not able to operate the teaching material object 500. In addition, the teaching material object 500 may be configured to be operable at the same time as it is displayed.

When the student terminal 30 receives the operation permission signal, the teaching material object 500 can be operated. The student can operate the teaching material object 500.

When the student terminal 30 receives the operation prohibition signal, the teaching material object 500 is not operable, and the student is not able to operate the teaching material object 500.

When the student terminal 30 receives the non-display signal, the display of the teaching material object 500 is turned off.

In addition, when a plurality of students view the class at the same time, the teaching material object may be displayed for each student, or one teaching material object may be displayed for a plurality of students.

As described above, the class system according to this embodiment is a class system that connects the communication class server 10 and the student terminal 30 to take a class conducted in an immersive virtual space. The communication class server 10 includes the distribution unit 103 that distributes class content for viewing the class conducted in the virtual space to the student terminal 30 and the transmission unit 104 that transmits the display signal and the non-display signal set according to the progress of the class to the student terminal 30. The student terminal 30 includes the VR function unit 301 that disposes and controls the avatar of the student who uses the student terminal 30 in the virtual space, receives the class content, and displays the class content from the point of view of the avatar and the object control unit 303 that makes the teaching material object 500 appear in the virtual space at the time when the display signal is received and makes the teaching material object 500 disappear at the time when the non-display signal is received. Therefore, since the student can observe the object related to the class in the virtual space, it is expected to promote the understanding of the class. In addition, since the teaching material object 500 is displayed or disappears as the class progresses, the student can concentrate on the class without being distracted by the teaching material object 500.

Further, the class according to this embodiment is different from a configuration in which the image of the class captured only from the front as in a TV program or an open university is transmitted in only one direction. In this embodiment, data of a virtual classroom in which a class is conducted using the images captured by the all-around camera that captures images in all directions of 360 degrees is generated. As a result, since the student feels more immersive and realistic as if the student is in the actual classroom, interest and satisfaction in the class increase. Furthermore, the teaching material object that can be observed in any direction of 360 degrees or can be moved or deformed is disposed in the classroom that can be observed from 360 degrees. Therefore, even when the teaching material object is observed from all directions, an image in the classroom is drawn as the background. Therefore, display is not broken, and the student's interest is not lost. Similarly, when a student avatar enters into the inside of the teaching material object and performs an operation of viewing the outside, there exists the image of the classroom in all directions. Therefore, the display is not broken, and the student's interest is not lost.

In addition, the example in which a live panoramic video is used as the class content has been described. However, a teacher avatar may be disposed in the classroom configured by computer graphics and may give a class. For example, motion data of the teacher avatar is created from a video obtained by imaging the teacher 40. The communication class server 10 transmits models and motion data of the object and the teacher avatar disposed in the classroom in the virtual space. The student terminal 30 disposes the object in the virtual space on the basis of the received information, applies the motion data to the teacher avatar to control the teacher avatar, renders the virtual space, and supplies a video to the HMD 31. The student terminal 30 may receive the image rendered by the communication class server 10 and display the image.

A video of an educational program recorded in the past may be used, the bones of a character may be detected from the video, and an avatar in the virtual space may be moved on the basis of the detected bones.

The example in which the stored class content is distributed has been described. However, the class content may be a class that is conducted in real time. The class content may be distributed in either a real-time remote class mode in which the class conducted by the teacher is distributed in real time or a time-shift remote class mode in which the class imaged or created in advance is distributed.

The real-time remote class mode is a mode in which the class currently being conducted by the teacher in real time is distributed to each student terminal 30 through the communication class server 10 and is then viewed. A plurality of students view the same class content at the same time. That is, a plurality of student avatars are present in the same virtual space. The teaching material object may be disposed for each of the student avatars, or one teaching material object may be disposed in the classroom. When one teaching material object is disposed in the classroom, the teacher may designate a student such that only the designated student can operate the teaching material object.

The time-shift remote class mode is a mode in which, instead of real-time class content, the class content imaged and produced in advance is stored in the server in advance, is delivered to the student terminal 30, which has sent a transmission request, at any time in response to the transmission request. In this case, for example, the motion of the student avatar that is viewing the class content is stored in the communication class server 10. For example, the stored motion of the student avatar is distributed to another student who views the same class content at a different time and is disposed as a classmate student avatar in the classroom in the virtual space of the class content. As a result, it is possible to obtain a pseudo effect as if different students who are separated in space and time are taking the same class together at the same time.

In both the real-time remote class mode and the time-shift remote class mode, the student terminal 30 may not transmit the motion of the student avatar or the like to the communication class server 10. A process corresponding to the motion of the student, such as the student avatar or the operation information of the teaching material object, is completed in the student terminal 30, which makes it possible to reduce the load on the communication class server 10. In addition, since the information of, for example, the motion of the student is not transmitted to the outside, it is possible to prevent information leakage.

REFERENCE SIGNS LIST

10 Communication class server
101 Input/output unit
102 Storage unit
103 Distribution unit
104 Transmission unit
11 Classroom display
12 Broadcast camera
13 Teacher terminal
14 Microphone
15 Speaker
20 Communication line
30 Student terminal 301 VR function unit
302 Input unit
303 Object control unit
31 HMD
32 Controller
40 Teacher
500 Teaching material object
510 Desk object
600L Left-hand object
600R Right-hand object

The invention claimed is:

1. A class system comprising a communication class server which is communicatively connected with at least one viewing terminal for conducting a class in an immersive virtual space,
wherein the communication class server is configured to:
store class content for viewing the class;
distribute class content for viewing the class to the at least one viewing terminal;
transmit first and second signal sets according to an elapsed time of the class to the at least one viewing terminal; and
transmit a permission signal and a prohibition signal according to the elapsed time of the class to the at least one viewing terminal,
wherein each of the at least one viewing terminal is configured to:
dispose in the immersive virtual space an avatar of a student using the viewing terminal and assign the student to control a teaching material, wherein the student controls the teaching material from the class content;
receive the class content transmitted from the communication class server;
display the class content from a perspective of the avatar based on a class progress scenario;
cause a three-dimensional object to appear in the immersive virtual space when the first signal set is received;
permit the student to manipulate the three-dimensional object when the permission signal is received;
prohibit the student from manipulating the three-dimensional object when the prohibition signal is received; and
cause the three-dimensional object to disappear when the second signal set is received, and
wherein the communication class server stores the class content in advance of distribution and is further configured to asynchronously distribute the class content to the plurality of viewing terminals.

2. The class system according to claim 1,
wherein the class content is a panoramic video obtained by imaging a class conducted in a real space, and
wherein, when the three-dimensional object is visible, display of the class content on the at least one viewing terminal comprises combining the three-dimensional object with the panoramic video.

3. The class system according to claim 1,
wherein the three-dimensional object is configured to be manipulated by the student.

4. The class system according to claim 1,
wherein, when the perspective of the avatar is inside a volume of the three-dimensional object, the display unit displays an inside of the three-dimensional object.

5. The class system according to claim 1, wherein the virtual space is generated based on a panoramic video obtained by imaging an entire circumference of a classroom in which the class is conducted.

6. The class system according to claim 1, wherein each of the at least one viewing terminal is further configured to transmit motion information of the avatar to the communication class server for storage,
wherein the communication class server is further configured to include in the class content the motion information of a first avatar received from a first of the at least one viewing terminal at a first time after the class content is recorded, and
wherein the communication class server includes in the class content the motion information of the first avatar when the class content is viewed by a second of the at least one viewing terminal at a second time after the first viewing terminal views the class content.

7. The class system according to claim 1, wherein the class content comprises a video obtained by using a camera to image a class conducted in a real space, and
wherein the class content further comprises virtual graphics in those portions of the class and/or the real space which are not imaged by the camera.

8. A viewing terminal for taking a class conducted in an immersive virtual space, the viewing terminal comprising a processor which is configured to:
dispose in the immersive virtual space an avatar of a student using the viewing terminal, such that the student can control the avatar, and assign the student to a teaching material, wherein the student controls the teaching material from the class content,
receive class content transmitted from a communication class server,
display the class content from a perspective of the avatar based on a class progress scenario,
cause a three-dimensional object to appear in the immersive virtual space when a first signal set relating to an elapsed time of the class is received from the communication class server,
permit the student to manipulate the three-dimensional object when a permission signal relating to the elapsed time of the class is received from the communication class server,
prohibit the student from manipulating the three-dimensional object when a prohibition signal relating to the elapsed time of the class is received from the communication class server, and
cause the three-dimensional object to disappear from the immersive virtual space when a second signal relating to the elapsed time of the class is received from the communication class server,
wherein the class content is recorded and stored in the communication class server in advance.

9. A method for taking a class conducted in an immersive virtual space, comprising:
disposing in the immersive virtual space an avatar of a student using a viewing terminal, such that the student can control the avatar, and assign the student to a teaching material, wherein the student controls the teaching material from the class content,
receiving class content transmitted from a communication class server,
displaying the class content from a perspective of the avatar based on a class progress scenario,
causing a three-dimensional object to appear in the immersive virtual space when a first signal set relating to an elapsed time of the class is received from the communication class server, permitting the student to manipulate the three-dimensional object when a permission signal relating to the elapsed time of the class is received from the communication class server, prohibiting the student from manipulating the three-dimensional object when a prohibition signal relating to the elapsed time of the class is received from the communication class server, and causing the three-dimensional object to disappear from the immersive virtual space when a second signal relating to the elapsed time of the class is received from the communication class server, wherein the class content is recorded and stored in the communication class server in advance.

10. A non-transitory computer-readable storage medium containing instructions which, when executed by a processor, cause the processor to carry out the method according to claim 9.

\* \* \* \* \*